United States Patent
Seppo

(10) Patent No.: US 9,434,101 B2
(45) Date of Patent: Sep. 6, 2016

(54) METHOD TO PRODUCE PLASTIC TUBE

(71) Applicant: Plastic Pipe Mobile OU, Tallinn (EE)

(72) Inventor: Takala Seppo, Belchatow (PL)

(73) Assignee: Plastic Pipe Mobile OU, Tallinn (EE)

( * ) Notice: Subject to any disclaimer, the term of this patent is extended or adjusted under 35 U.S.C. 154(b) by 0 days.

(21) Appl. No.: 14/399,409

(22) PCT Filed: Apr. 18, 2013

(86) PCT No.: PCT/FI2013/000022
§ 371 (c)(1),
(2) Date: Nov. 6, 2014

(87) PCT Pub. No.: WO2013/160529
PCT Pub. Date: Oct. 31, 2013

(65) Prior Publication Data
US 2015/0122405 A1    May 7, 2015

(30) Foreign Application Priority Data

Apr. 26, 2012 (FI) ...................... 20120139

(51) Int. Cl.
| | |
|---|---|
| *B29C 53/60* | (2006.01) |
| *B29C 53/56* | (2006.01) |
| *B29C 53/72* | (2006.01) |
| *F16L 9/128* | (2006.01) |
| *B29C 53/80* | (2006.01) |
| *B29C 65/40* | (2006.01) |
| *B29C 65/00* | (2006.01) |
| *B29D 23/00* | (2006.01) |
| *B29C 53/78* | (2006.01) |

(52) U.S. Cl.
CPC ............ *B29C 53/562* (2013.01); *B29C 53/60* (2013.01); *B29C 53/72* (2013.01); *B29C 53/8066* (2013.01); *F16L 9/128* (2013.01); *B29C 53/566* (2013.01); *B29C 53/78* (2013.01); *B29C 65/40* (2013.01); *B29C 66/4322* (2013.01); *B29C 66/4329* (2013.01); *B29C 66/49* (2013.01); *B29D 23/001* (2013.01); *Y10T 156/1033* (2015.01)

(58) Field of Classification Search
None
See application file for complete search history.

(56) References Cited

U.S. PATENT DOCUMENTS

| 4,333,783 A * | 6/1982 | Gardner ................ B65H 81/08 |
| | | 156/187 |
| 2008/0138553 A1 | 6/2008 | Lauer et al. |
| 2011/0057350 A1 | 3/2011 | Hombert et al. |

FOREIGN PATENT DOCUMENTS

| WO | 0035660 | 6/2000 |
| WO | 02055285 A1 | 7/2002 |
| WO | 03024685 A1 | 3/2003 |

OTHER PUBLICATIONS

International Search Report re PCT/FI2013/000022, mailed Aug. 19, 2013, 4 pages.

*Primary Examiner* — Barbara J Musser
(74) *Attorney, Agent, or Firm* — Ziegler IP Law Group, LLC

(57) ABSTRACT

A method to produce plastic tube. The material of the plastic tube is fed around a core having a same diameter as the inside diameter of the tube. The material is fed as an uninterrupted material flow which, after having settled upon the core, goes forward following essentially the helical line in the side direction of the core inside a mold mounted on the core. The plastic tube is formed of the material ribbons and melted plastic material fed to the spaces between the ribbons. The round and rising sheet at the end of the mold directs the material flow to the side direction of the core and the head of the plastic tube gets welded and fixed to the starting tube that is used to draw the tube as the production process advances in the side direction of the core.

8 Claims, 3 Drawing Sheets

Det Z

METHOD TO PRODUCE PLASTIC TUBE

Figure 1:
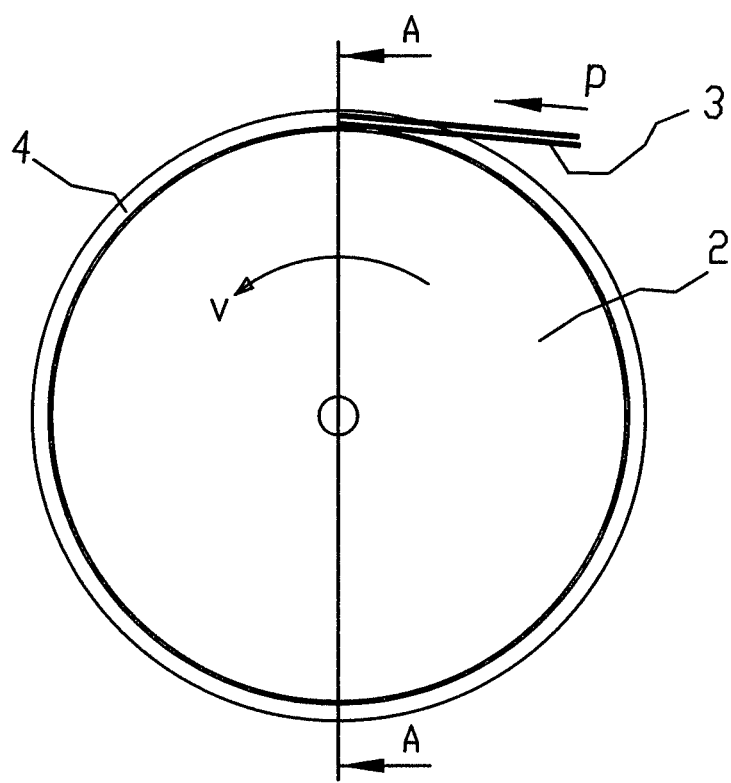

The subject of this invention is a method to produce plastic tube, according to which method the material of the tube is fed upon a core that has the same diameter as the inside diameter of the tube as an uninterrupted material flow so that the material flow upon the core after having settled advances following essentially the helical line.

Possible uses of the invention are the plastic tubes that are used for instance in the industry and the power plants as the cooling water tubes, the rain water tubes and in the rain water drains as the compensation basis and also in the mining processes, the waste water purification plants and the wood processing industry to move or store liquids. These tubes are known to be large and they have to withstand outside and inside pressure and other physical loads that are directed to them. Favorable usages of them are the sensitive places where there can occur an earthquake or if the soil can move in another way, like subsidence sensitive places, because the tubes are elastic and withstand thus better the movement of the soil near them than corresponding tubes made of steel or concrete.

One favorable usage of the production method according to the invention is the production of the tube parsons. They have a thicker wall than normally and they are machined and welded to be parts of tubes.

In accordance with the known technique these tubes are produced so that a plastic material coming from an extruder is directed as a continuous ribbon around a core, i.e. a roll ring, in such a way that the rotating movement of the rolls and the pushing power of the material that is fed cause the material ribbon to start to get around the roll ring. And as at the same time the feeding nozzle of the material ribbon lengthwise in the core is moved so that the movement of the nozzle is less during one round of the core than the width of the ribbon, the situation is reached where the ribbons settle upon the core partly overlapping and where the advancement of the material ribbon follows the form of the helical line. Another alternative is to move the nozzle with such a speed that the advancement of the material ribbon is its width per one round of the core. In this case, the material ribbon sides join to each other with so called butt joint. After having fed one layer of material upon the core, the length of which determines the maximum length of the tube, the material feeding nozzle direction is changed the opposite and upon the layer of the material on the core another layer of the material is fed. This process continues until the wall thickness of the tube is sufficient. Thereafter the core, i.e. roll ring is reduced inside the plastic tube and the plastic tube is drawn from around the core lengthwise. According to the known technology the maximum length of this kind of cores is some 6 meters. The above mentioned tubes are then joined together to form pipelines.

The above described known technique is used for example by the German company Krah AG in their production. This can be studied in more detail in their Internet site: www.krah.net/.

One known method to produce large tubes is to use the so called traditional direct extruding. This method is used for instance in the production of the company KWH PIPE.

One of the greatest drawbacks of the known technique that is based on the rotation technique can be considered that those production methods set tight limits for how long tubes can be produced and also that numerous layers of material must be rolled upon the core in order to achieve the wanted wall thickness. The first weakness that was mentioned comes real in the relatively high production and installation costs and the latter one in addition to the production costs the tubes so made have a relatively low strength because of the layer structure. One factor for the relatively low strength in these tubes is that they are subsequently heated many times that the known technique requires.

In the methods that are based on the direct extrusion when making large tubes a big drawback is that the material flows and thus the wall thickness of the tube is not regular. This means big tolerances in the wall thicknesses and big material losses, and further due to what has been said the cooling of the tube is irregular and thus big internal tensions are formed in the tube.

We can say that a drawback of all the known technique is also that when producing tubes with those techniques massive machines and equipments must be used and so the locations of the tube factories are defined by other things in many cases than the usage places of the tubes. This means relatively expensive transportation costs.

The meaning of this invention is to achieve such a production method that drawbacks of the known technique are avoided. It is characteristic for the solution according to this invention what has been stated in the characterizing part of the claim 1.

The greatest advantages that this invention brings forth are that the limitations of the maximum lengths of the tubes are avoided that are produced and a considerable amelioration of the strength capabilities of the tubes is achieved. As the desired material thickness is achieved through one ribbon flow of the material so a seamless structure in the direction of the wall thickness gives a considerably stronger strength for the wall. Due to the composition of the material flow and the other invention characteristics the flow downward is considerably smaller and the direct advantage that is obtained is that exact wall thickness tolerances are achieved. Due to cooling of the more even tube material, smaller form change is obtained and it leads in turn to a greater accuracy in the production of the products. In addition to what has been mentioned, savings in the material use are also obtained.

Using the technique of the invention, a very big advantage is achieved because the machines and the equipments and also the whole tube factories are considerably smaller and simpler in size and in composition than the present machines, equipments and the factories. A factory can be established when a certain size demand occurs in where ever or near and so in the transportation and the storage costs also great savings can be obtained. Because the production process line is considerably shorter and more lightly equipped than the production lines of the known technique factories, the production of the largest tubes does not cause a radical size enlargement of the production equipment.

The term "core" in this document means such an organ or arrangement that is suitable to support a material flow in the production process of a plastic tube and this organ or arrangement also gives it a wanted shape and size.

The invention is described in more detail in the enclosed pictures, where

FIG. 1, presents the production process in operation seen from the end of the production line according to the invention.

Figure 2:
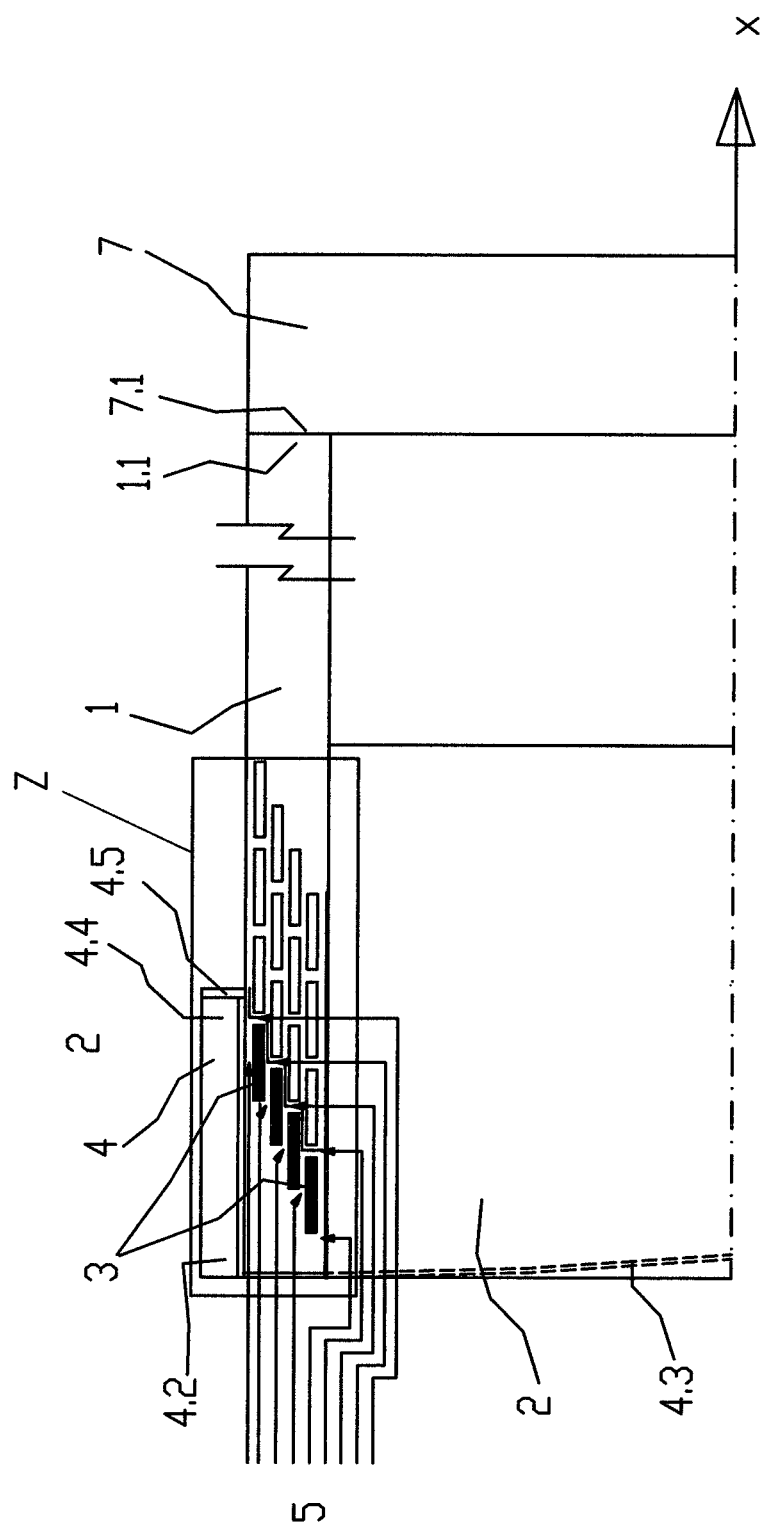
Figure 3:
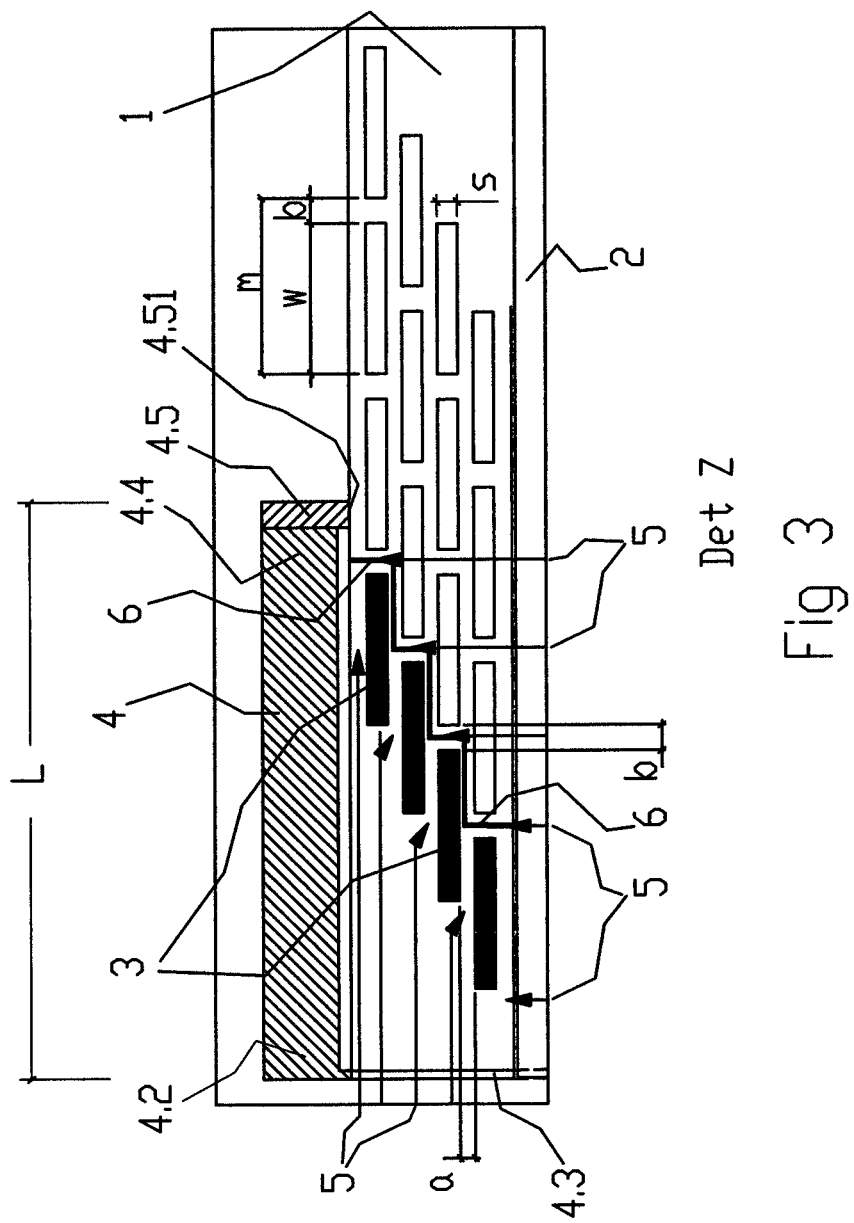

FIG. 2, presents the sectional view A-A of FIG. 1,

FIG. 3, presents the detail in point Z of the previous sectional view

FIG. 1 presents the production process according to the invention seen from the end of the line. The cylindrical core 2 can be seen, that has the diameter of many meters in this example, and the prefabricated material ribbons 3 that are fed upon with the rotation speed v rotating core 2. FIG. 2 in turn presents the sectional view A-A of FIG. 1. The prefabricated material ribbons 3 coming from the reels, in this example 4 ribbons, are fed into a steady upon the core staying mold so that the material ribbons are overlaying each other (also FIG. 3) while the core is rotating around its axis. The material ribbons 3 turn due to their feeding pressure p and the rotation movement of the core 2 around the core inside the mold 4. The mold 4 is concentric with the core 2 and it is fed inside the mold 4 at the same time as from one or more extruder coming melted plastic material 5. The wall of the plastic tube 1 to be produced is thus composed of the material ribbons 3 and melted plastic material 5 that form together the material flow to be fed into the mold. There is so much of the melted plastic material during the process in the mold that the material ribbons 3 press to the core in practice through the melted plastic material 5 and this melted plastic material fills the core radius directional gaps a of the material ribbons 3 on the core. At the end 4.2 of the mold 4 that does not rotate and is also otherwise steady there is an end plate 4.3 that has wound around the core following the helical line. The sheet 4.3 forces the material ribbons 3 and the melted plastic material 5 to move upon the core 2 sideways x in the way that its rise necessitates. So, the rise of the sheet 4.3 and the rotation speed v of the core affect to the speed of this movement. The rise of the plate 4.3 has been set so that when the core has rotated a full round the material ribbons 3 and the melted plastic material 5 have moved upon the core a little bigger distance than the width w of the material ribbon 3 so that the material ribbons come for the start of the next round upon the material ribbons of the previous round overlapping with them. To be precise, the movement of the material ribbons m is exactly the sum of the width w of the material ribbon during 2 rounds of one core and the gap b between the material ribbons. As the process advances, the melted plastic material 5 fills all the time also the lengthwise gaps b of the core, even when they have been formed during different rotations.

When the material ribbons get overlapping upon each other the melted plastic material 5 gets welded together in the welding joint 6 between the layers. So the welding joint 6 advances through the wall of the plastic tube 1 that is getting produced forming a very strong and tight joint that advances in the plastic tube 1 that is being produced following the helical line.

In the beginning of the production process of the plastic tube 1 when using the method according to this invention, the material ribbons 3 and the melted plastic material 5 are fed first to the end of the starting tube 7 that is rotating with the same speed as the core and is being used to help the process (FIG. 2). The end 1.1 of the tube that is formed of the material ribbons 3 and the melted plastic material gets welded to the end 7.1 of this starting tube 7 and after this, the starting tube 7 is started to be moved to the side direction x with the same speed as the plate 4.3 at the end of the core pushes the material ribbons 3 and the melted plastic material 5 to the same direction. When this sideways movement takes place and when the just formed plastic tube is pushed out of the mold, the plate 4.5 at the other end 4.4 of it that is a level ring plate operates as a definer of the thickness of the wall of the tube. So the edge 4.51 of the hole of the plate 4.5 regulates the layer thickness to be what has been desired. The welding takes place inside the mold 4 and when the tube 1 comes out of the mold it tolerates pull to the direction x. After this, the plastic tube that has been produced is cooled using some known technique, like for instance water or air cooling system.

The material ribbons 3 are fed upon the core 2 tangentially or in some favorable angle in relation to this tangential line. The overlapping of the material ribbons 3 is about a half of their displacement m in the previous example but it can be also some else that is suitable in each case. When defining this overlapping, one factor to take into account is the wall thickness of the plastic tube 1 to be produced. The thicker this wall is the broader is the width of the mold 4 to be used. By reducing the overlapping the width of the mold can be kept within certain limits. Typically, the width L of the mold varies in the use of the method according to the invention about 0.3-1.5 m but it can also deviate from these limits.

As in the method according to the invention, the material ribbons 3 are produced beforehand and they are stored for instance in reels this gives many considerable advantages. In doing so, the extruders are not needed to produce the material ribbons 3; instead they are delivered to the production place packed solid in reels or corresponding. In addition, the cool material ribbons 3 speed the melted plastic material 5 to cool in the production process of the tube and thus for instance the flowing material is not so common and the amount of energy that is needed in the production of the tubes is considerably lower than when using the methods of the known technique. Due to what has been said before, the establishment of a whole plastic tube factory in any place necessary is a considerably smaller investment and action than the establishment of a corresponding factory that uses the known technique.

The cylindrical shell of the mold 4 can be made continuous of some suitable material, like PTFE coated steel, or it can be formed of stripe like pieces so that regulating the relative locations of these pieces can change the diameter of the edge 4.51 of the hole. This, then, has a direct effect to the outer diameter of the plastic tube that is being produced.

The width w of the material ribbon can be any suitable for the situation. When producing large tubes, the width of for instance 150-500 mm can be used. The thickness of the material ribbon that is used is defined by thickness of the wall of the tube that is being produced. In this method according to the invention, all those thicknesses s can be used that are needed for the tubes that are needed nowadays. One defining factor when choosing the width of the material ribbon can be the costs of procuring the tool.

The rotation speed v of the core 2 can as well be any speed that is suitable for the other phases of the production of the tube like for instance making the extrude welding. It can be said with a good reason that it is possible to use even a speed of over 10 m/min in the method according to the invention when feeding the material ribbon 3 on the core.

One invention characteristic of the before mentioned method is that the material ribbons are pre-produced directly from the raw material to the ribbons and thus the granulation is not needed. This saves energy.

Likewise, an invention characteristic of this method is that these material ribbons 3 can be fed on the core 2 from multiple reels at the same time. This makes possible that different layers can be made to the tube that is being produced. For instance, all the ribbons need not contain the pigments of the surface layer of the tube because this ribbon can be made differentially than the other ribbons that are used at the same time.

Adding fibers to certain material ribbon/ribbons 3 when they are being produced is also an invention characteristic that is part of this invention method. These fibers can consist of any such material that is favorable for the use of the tube to be produced.

It is possible to produce using the method of this invention a very wide range of different tubes. The diameter of the tube to be produced can vary from under a meter to many meters.

It must be noticed that even though this description sticks to one example that is favorable for the invention, this does not mean to limit by any means the use of the invention only to this kind of use but many variations are possible within the invention idea limits defined in the Claims.

The invention claimed is:

1. A method to produce a plastic tube, according to which method a material of the plastic tube is fed upon a core that is equal in size as an inside diameter of the plastic tube, the material of the plastic tube being fed as an uninterrupted material flow so that the material flow advances after having come upon the core essentially following a helical line, wherein
   the core is a tube that rotates during the production process around a central axis,
   upon the core there is an essentially cylindrical and concentric mold, a first end of the mold comprising a stationary end plate that includes a portion angled in the direction of the advance of material flow upon the core directing the material flow to move in a direction along the axis of the core toward an other end of the mold during rotation of the core, wherein the other end of the mold includes an end plate having an edge portion that defines an opening between the edge portion and the core, the opening configured to define a wall thickness of the plastic tube being produced over an outside diameter of the core,
   wherein the material flow consists of at least one solid material ribbon and a melted plastic material,
   each material ribbon advances upon the core following the helical line to form material ribbon rounds upon the core, wherein a gap is defined between adjacent material ribbon round, the gap having a width that corresponds to an extent of the inwardly angled portion of the stationary plate on the first end of the mold,
   the melted plastic material fills the gaps between adjacent material ribbon rounds and other gaps between the material ribbon rounds, where the adjacent layers of material ribbon rounds are welded together along a welding joint,
   an end of the plastic tube is pressed and fixed by welding to an end of a starting tube, the starting tube being a continuation of the core, concentric and rotating with the same speed, and
   wherein the starting tube and the plastic tube that is fixed to it are moved in the direction of the central axis with the same speed as the plastic tube is produced in the mold.

2. A method according to claim 1, wherein the material flow consists of more than one material ribbon, wherein there is an overlapping of two layers of ribbon rounds in the direction of the central axis of the core.

3. A method according to claim 1, wherein the material ribbons are produced before producing the plastic tube and stored in reels from where the material ribbons are fed onto the core.

4. A method according to claim 3, wherein the material ribbons are produced directly from raw material into the material ribbons without granulation.

5. A method according to claim 1, wherein the material ribbons are fed upon the core from more than one reel at the same time.

6. A method according to claim 3, wherein one or more of a pigment or fiber material is added only into a part of the material ribbon material during production.

7. A method according to claim 1, wherein the mold comprises steel or plastic material or a combination of the steel and plastic material.

8. A method according to claim 1, wherein the starting tube is moved by machine power in a direction of the formation of the plastic tube along the central axis during the production process of the plastic tube.

* * * * *